Sept. 7, 1965  R. H. WADSWORTH  3,204,522
SLIDE EJECTOR AND LOADING APPARATUS
Filed Dec. 29, 1961  5 Sheets-Sheet 1

INVENTOR.
RAYMOND H. WADSWORTH
BY
ATTORNEYS

Sept. 7, 1965   R. H. WADSWORTH   3,204,522
SLIDE EJECTOR AND LOADING APPARATUS
Filed Dec. 29, 1961   5 Sheets-Sheet 2

INVENTOR.
RAYMOND H. WADSWORTH
ATTORNEYS

INVENTOR.
RAYMOND H. WADSWORTH

ATTORNEYS

Sept. 7, 1965      R. H. WADSWORTH      3,204,522

SLIDE EJECTOR AND LOADING APPARATUS

Filed Dec. 29, 1961      5 Sheets-Sheet 4

INVENTOR.
RAYMOND H. WADSWORTH

BY

ATTORNEYS

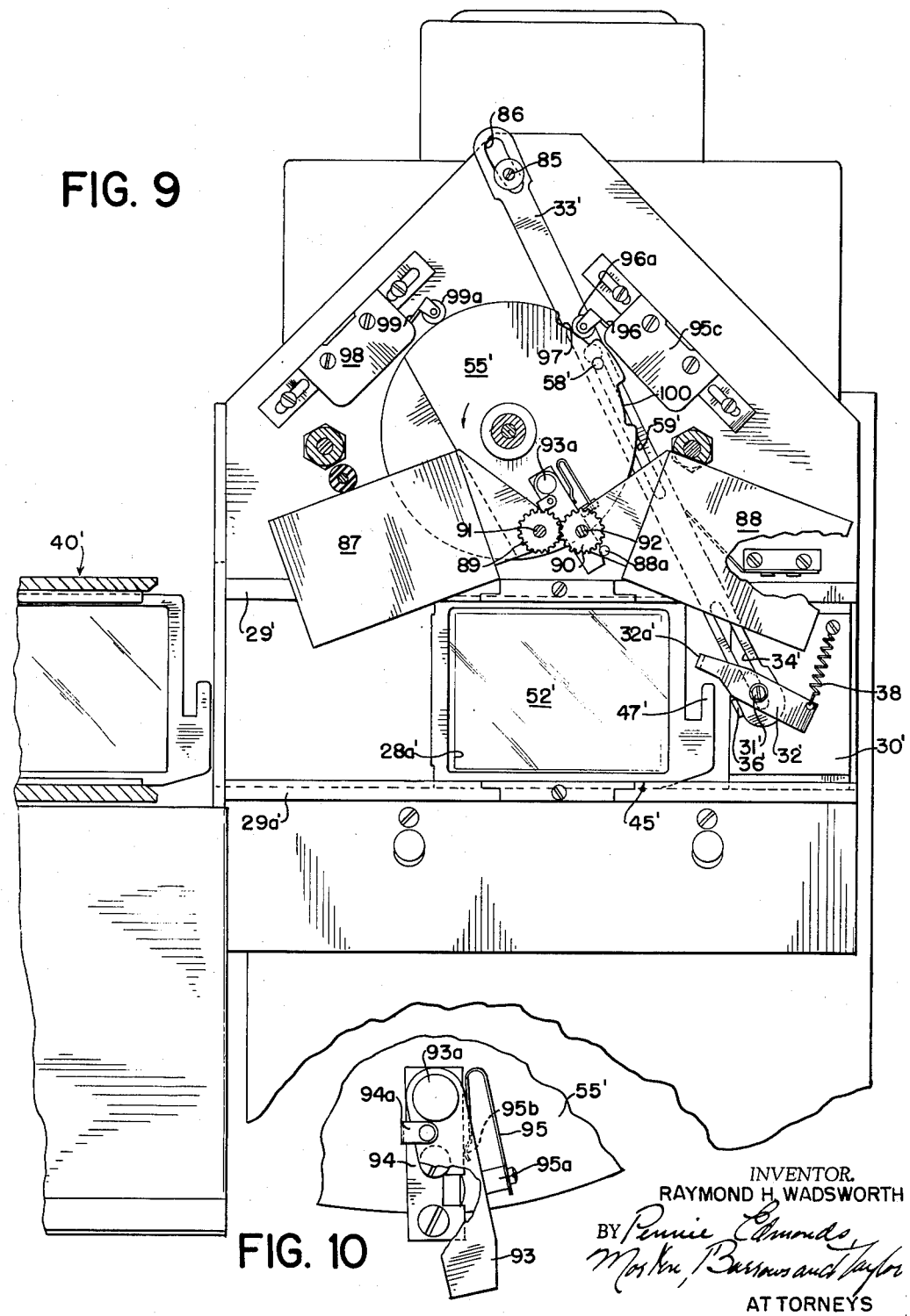

United States Patent Office 3,204,522
Patented Sept. 7, 1965

3,204,522
SLIDE EJECTOR AND LOADING APPARATUS
Raymond H. Wadsworth, South Orange, N.J., assignor to Teleprompter Corporation, New York, N.Y., a corporation of New York
Filed Dec. 29, 1961, Ser. No. 163,272
5 Claims. (Cl. 88—27)

This invention relates generally to improvements in slide projectors and more particularly to a novel, improved arrangement for loading a slide into the projection aperture of a slide projector and for ejecting the slide therefrom. The ejecting and loading apparatus of the invention is particularly adapted for use with a slide magazine of novel construction or with a plurality of such magazines, and when so used, will permit substantially complete, individual movement of the magazine or magazines without interference from the ejecting and loading apparatus.

Conventional automatically fed slide projectors include a rectangular or box-shape magazine which is attached to a movable carriage adjacent to the slide projection aperture. The slides are arranged within the magazine in a single row and ordinarily are positioned in sequence for loading and unloading into and from the projection aperture by progressive stepped movement of the carriage in a direction generally parallel to a projection axis. Each slide is mounted within a slide holder which may be withdrawn from the slide of the magazine immediately adjacent to the projector for insertion into the projection aperture, and is returned to the magazine when projection has been completed. The slide holder and magazine ordinarily are straddled by a loading and ejecting mechanism comprising a horizontal reciprocatory actuating arm having spaced vertical legs, which contact and engage the slide edges of the slide holder initially to withdraw the slide from the magazine, hold the slide in viewing position and finally, to return the slide to the magazine.

The foregoing arrangement presents certain innate deficiencies. The described ejecting and loading apparatus is necessarily limited in operation to its use with elongated rectangular-shaped magazines and further requires that movements of the magazine be of a simple translatory nature to prevent interference between the structures of the loading and ejecting apparatus and of the magazine. The number of slides which may be conveniently held by such magazines is limited, requiring manual interchanging of different magazines for showings of large groups of slides.

In accordance with the present invention, I have devised a novel slide projector loading and ejecting apparatus, which is independent structurally and operatively from an adjacently situated magazine, except during a loading and ejecting cycle. In combination with the new ejector and loading apparatus, I provide a cylindrical slide magazine, with slides withdrawable radially from the periphery of the magazine. The magazine may be rotated to new positions relative to the projection aperture of the projector without interferring with the slide loading and ejecting apparatus. Any one of several coaxial, superposed magazines may be raised or lowered until the periphery of the selected magazine is placed adjacent and at the same level with the slide projection aperture. The cylindrical form of the magazine permits large numbers of slides to be maintained in readiness for viewing, and individual slides are made available for withdrawal from the magazine by rotation and indexing of the magazine under the control, for example, of a remote slide selection control device.

More specifically, the present slide loading and ejecting apparatus comprises a projector frame, having a projection aperture which is adapted to receive a slide for projection upon a screen. A portion of the frame includes a track which supports a slide mount for translatory movements from side to side and across the projecting aperture. Pivotally attached to the slide mount is a slide loading and ejecting finger forming a hook at one end thereof, which may be lowered into engagement with a slide holder when the holder is adjacently and externally positioned in a magazine respective of the projector frame. In addition I provide automatic means for causing translating reciprocatory movement of the slide mount and slide engaging finger such that the slide may be withdrawn from a magazine, moved into the projection aperture and returned into the magazine.

As a further aspect of the invention, I provide a magazine of generally flat cylindrical shape with slide openings or storage recesses arranged radially about the periphery of the magazine. Accordingly, the magazine may be positioned for rotation, and the periphery thereof placed adjacent to the projection aperture of the projector. Individual slides held therein may be withdrawn by the above-described loading and ejecting apparatus for movement into and from the projection aperture. As will be described in detail herein, the slide ejector and loading apparatus of the invention includes means for insuring the positive engagement of the ejector and loading apparatus with the slide and its holder at all times when the slide is to be moved, and for positive disengagement of the apparatus from the slide when the latter is in viewing position or when the slide has been returned to the magazine. A further advantage of the disclosed specific loading and ejector apparatus is that movements of the slide are extremely smooth, resulting in uniform acceleration, deceleration and intermediate velocity characteristics.

In the following description, reference is made, by way of a non-limiting example to one form of construction of a slide projector loading and ejector apparatus devised in accordance with the invention and illustrated in the accompanying drawing in which:

FIG. 9 illustrates a modified form of the invention; and

FIG. 10 is a fragmentary cross-sectional view of the modified form of the invention as shown in FIG. 9 showing the shutter actuating means in detail.

Figure 2:
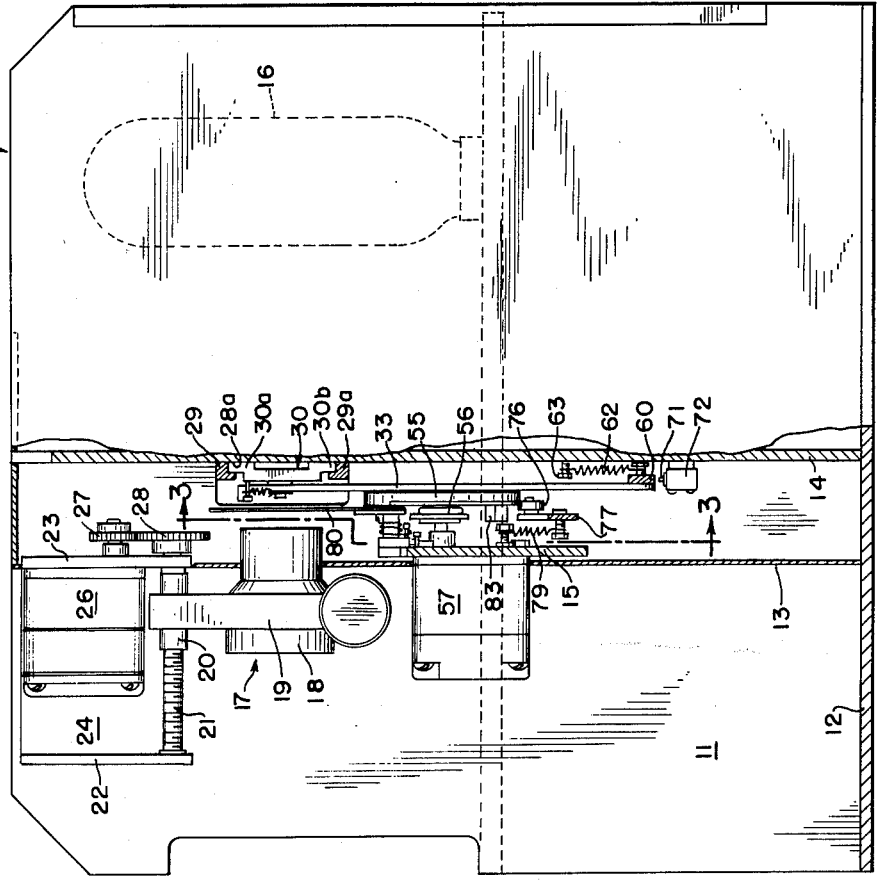
FIG. 2 is a fragmentary cross-sectional view taken in the direction of arrows 2—2 of FIG. 1.
Figure 1:
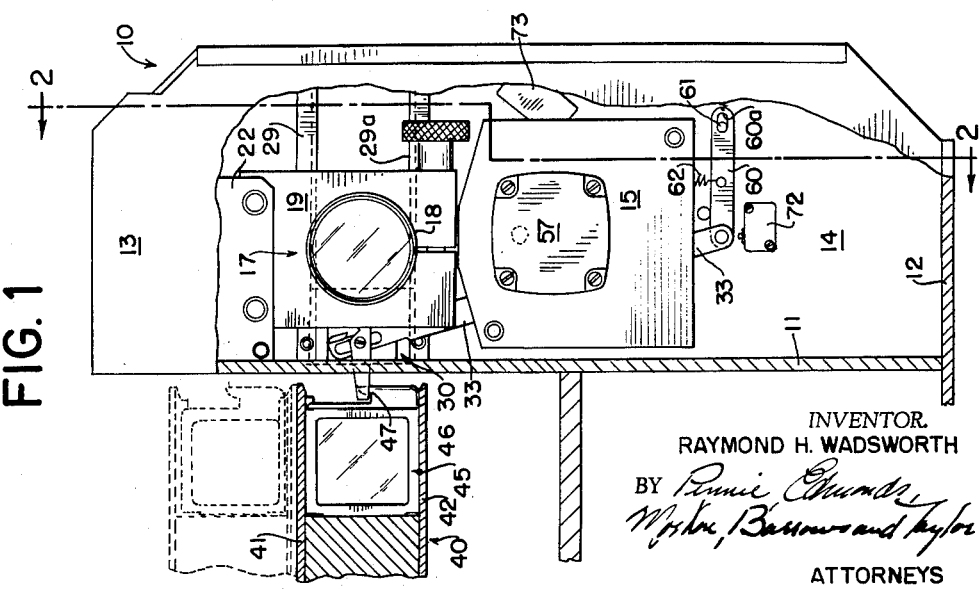
FIG. 1 is a fragmentary cross-sectional view in elevation showing the overall arrangement of the ejector and loading apparatus, the projection aperture and the slide magazine.

Referring now to the drawing and particularly to FIGS. 1 and 2 thereof, a portion of a slide projector 10 has been illustrated, incorporating the slide loading and ejector apparatus of the present invention. The projector 10 comprises a frame 11 mounted on a base 12 with supporting, internal transverse partitions 13 and 14. The projector includes a conventional light source 16 and a lens unit 17 positioned forwardly thereof along a projection axis. The lens unit 17 is included in a multi-diametered, generally cylindrical sleeve 18, which is held in a depending mounting arm 19. The arm 19 at the upper end thereof forms a threaded bore 20 which receives an actuating screw 21 journalled for rotation in end supports 22, 23 attached by an intermediate web 24 to the body of the projector. Similarly secured is a small low-power reversible electrical motor 26 whose output shaft drives a pinion 27, the latter being maintained in meshing engagement with an adjacent pinion 28 atached to the screw 21. By this arrangement, energization of the motor 26 will drive the screw 21 to cause translation of the lens unit 17, for permitting focus adjustment of the lens unit.

Rearwardly, or in a direction toward the light source 16, partition 14 defines a slide or projection aperture 28a into which individual slides may be moved for projection. Attached to the partition 14 are opposed tracks 29, 29a which extend laterally above and below the aperture 28a and for a distance at each side thereof. The tracks 29, 29a slidably receive a slide member 30, whose upper and lower legs 30a, 30b are held in sliding contact against the adjacent face of the partition 14.

Figures 7, 8:
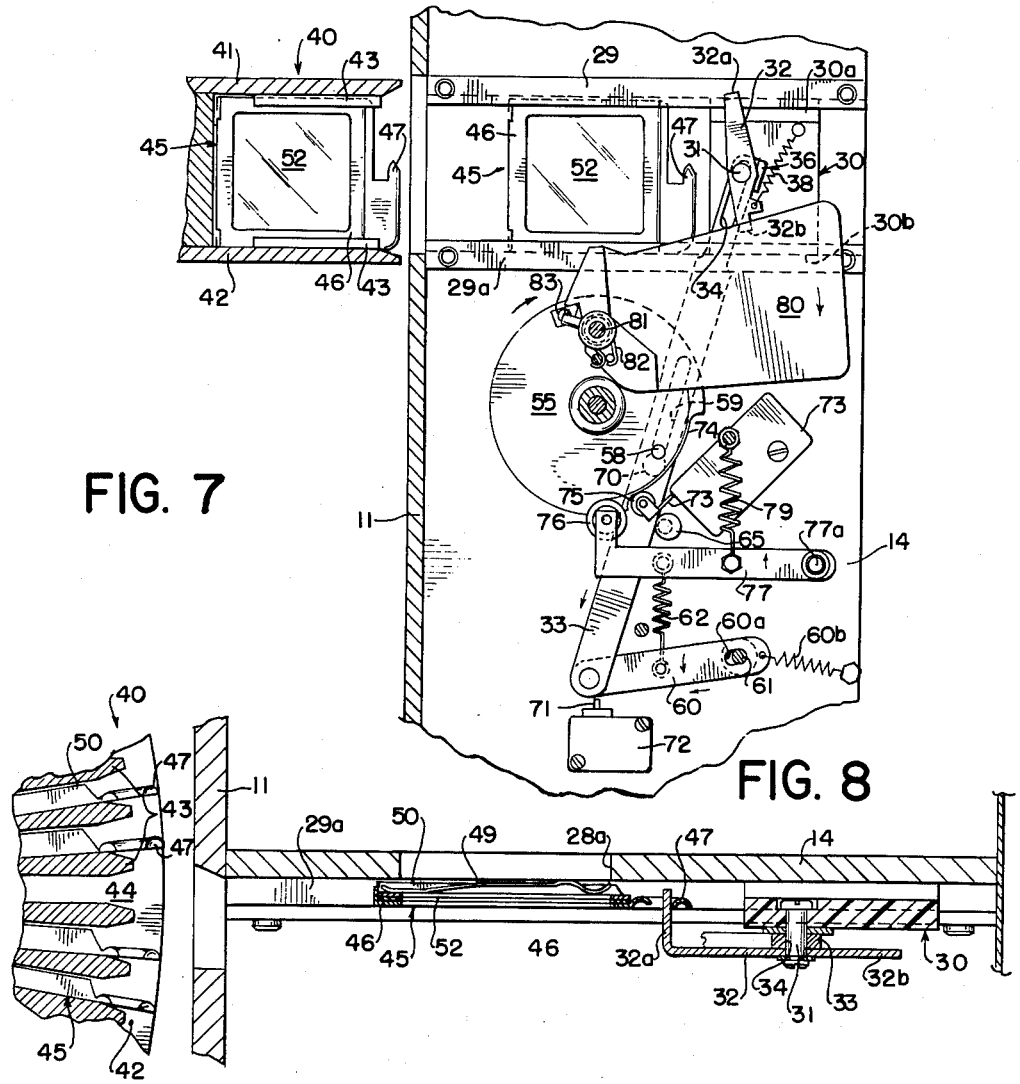
FIG. 8 is a cross-sectional view taken in the direction of the arrows 8—8 of FIG. 6.

As best seen in FIG. 8, the slide member 30 mounts a pin 31 and pivotally connected thereto is a slide engaging finger 32. The finger 32 is formed having a leg 32a generally at right angles to the main body of the finger which serves as a hook for engagement with a portion of a slide holder. Intermediate the finger 32 and the slide member 30 is the upper end of a slide actuating arm 33 which makes a slidable connection with the pin 31. The arm 33 has been provided with an elongated slot 34 thereby permitting relative movement, in a longitudinal direction, of the upper portion of the arm 33 with respect to the finger 32. Also, the extreme upper end of the arm 33 has been provided with a cam 36 and immediately below the cam the finger 32 defines a cooperating cam surface. As will be seen with reference to the relative positions of the parts in FIGS. 3 and 4, when the arm 33 and the cam 36 move downwardly with respect to the finger 32, the cam 36 will depress the end 32b of the finger 32 with respect to its pivot about the pin 31 and the hooked end 32a of the finger will be raised. A tension spring 38 is attached to the depressible end 32b of the finger and to the slide member 30 to provide a resilient biasing of the finger 32 into a normally horizontal position.

According to the invention, I have devised a slide magazine 40 which is of generally flat cylindrical construction. The magazine 40 includes two opposing upper and lower discs 41, 42 which serve to hold and locate (see FIG. 8) intermediate, perpendicular radial partitions 43. The adjacent partitions 43 defines radial slide recesses or compartments 44 for the reception of slide holders 45. The compartments 44 are open about the periphery of the magazine 40 and therefore the holders 45 may be withdrawn from the compartments 44 and returned thereto peripherally. The magazine 40 is mounted to a central hub 40a, which may be driven by an appropriate indexing mechanism and the magazine is arranged with respect to the projector 10 such that the periphery of the magazine is situated immediately adjacent to the projector frame and at the same level with the projection aperture. As illustrated in phantom lines in FIG. 1, the magazine 40 may be one of several concentrically superposed magazine units of similar construction holding, for example 100 slides apiece. A single selected magazine may therefore be raised or lowered to a level position respective of the projection aperture and thereafter indexed to an individual, peripheral slide position.

Figure 4:
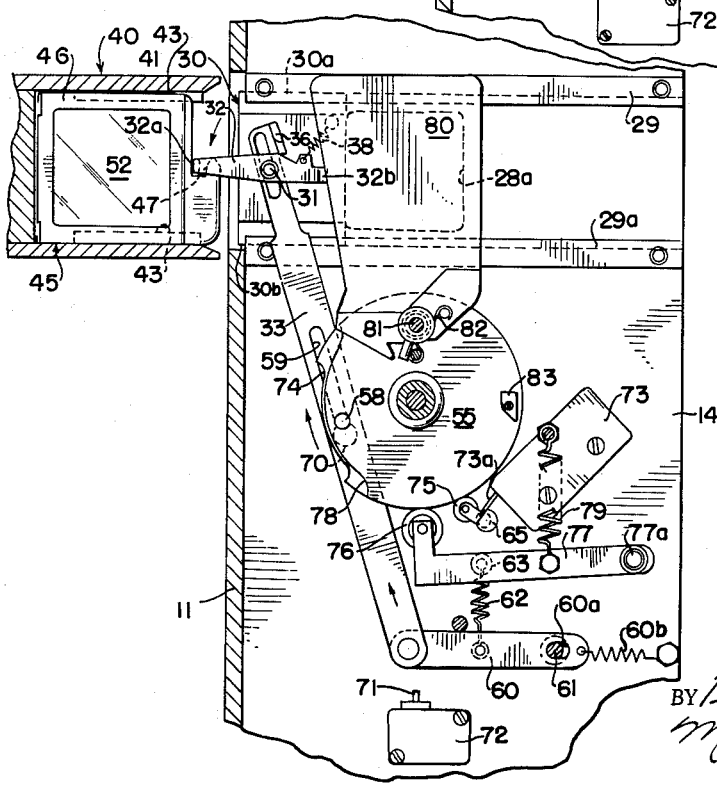

Each slide holder 45 comprises an essentially flat rectangular frame 46 having at one end facing outwardly of the magazine, a stamped upright hook 47 for permitting engagement of the hooked end 32a of the finger 32 with a slide holder when the finger has been lowered into horizontal position (see FIG. 4). Referring to FIG. 8, the slide holders 45 each include upper and lower horizontal flanges 50 which are integral with the frame 46 of the holder. Leaf spring clips 49, are perpendicularly attached to the flanges 50, and oppose the frame 46 to permit the insertion of a slide 52 between the clips and the frame.

Proceeding now to a further specific description of the actuating portions of the slide ejector and loading apparatus of the invention, in accordance therewith I provide a generally circular, rotatable actuating member 55. The actuating member 55 is attached by a slip clutch 56 to the output shaft of a reversible electric drive motor 57 (FIG. 2). The motor is attached to a vertical mounting plate 15. The purpose of the clutch 56 is to avoid overloading the motor 57 when the member 55 has been fully rotated in clockwise or counterclockwise directions into either of two terminal positions as will be described. Therefore, for purposes of the description, the connection of the member 55 with the motor 57 may be treated as a direct connection. The member 55 mounts a drive pin 58 (FIGS. 3–7) at a point offset from its axis of rotation, and the pin is received within a longitudinal elongated slot 59 in the actuating arm 33. The lower end of the arm 33 is pivotally connected to a link 60. The link 60 possesses a slot 60a which slidably and rotatably receives a pivot pin 61 affixed to the partition 14. A tension spring 62 is attached to the link 60 and to a mounting stud 63 to urge the link 60 in a clockwise direction about the pin.

Figure 3:
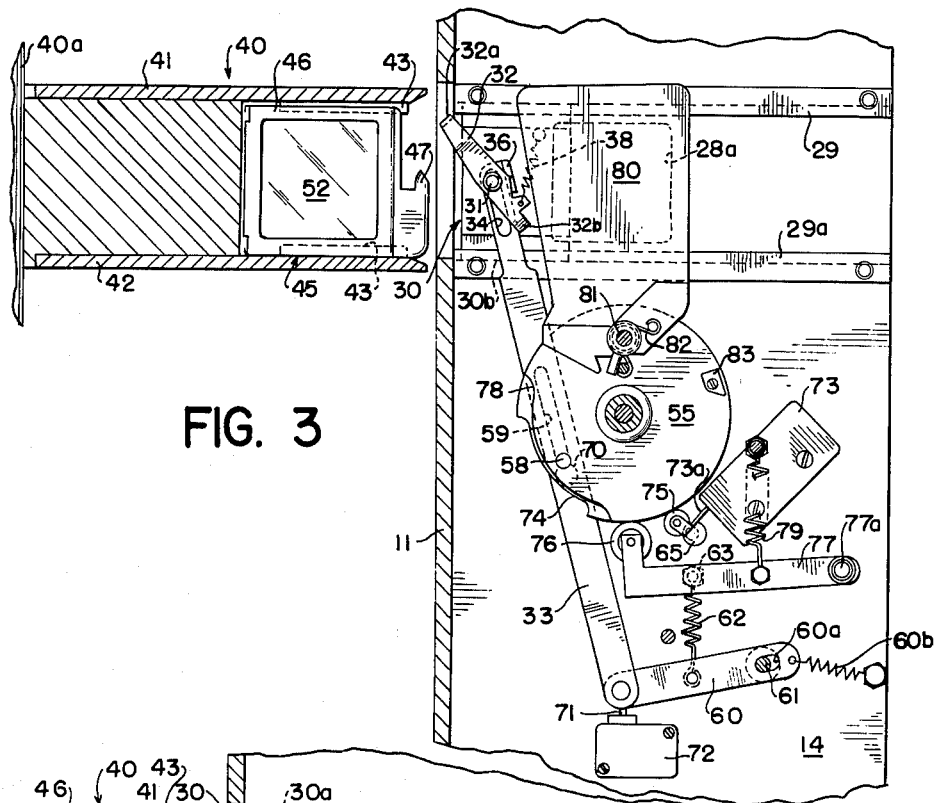
FIGS. 3-7 are detailed elevational views of the apparatus of FIG. 1 showing in sequence, the movement of a slide from the magazine into viewing position in the projection aperture.

With the respect now to the sequence illustrated in FIGS. 3–7, in FIG. 3, it will be assumed that the member 55 has previosuly been driven counterclockwise by the motor 57 to the first of its terminal positions. In this position, the drive pin 58 has been forced into engagement against a cushion or pad 70 of shock absorbent material at the lower end of the slot 59 in the arm 33. The arm 33 is thus held in a downward direction generally away from the projection aperture 28, and in this position, the lower end of the arm 33 depresses an actuating button 71 to energize a small electric switch 72. The function of switch 72 is to deenergize the motor 57 when the latter has driven the actuating member 55 into the position of FIG. 3, the first terminal position. In this position the cam 36 affixed to the upper end of the actuating arm 33 will have been moved downwardly relative to the end 32b of the finger 32 thereby rotating the finger and raising the hooked portion 32a thereof into the position shown. The finger 32 is completely disengaged from the slide holder 46 and is further completely recessed within the projector frame so that the magazine 40 may be rotated into a new indexing position for the profferrence of a new slide.

It will be further assumed with respect to the initial portion of the sequence disclosed in FIG. 3, that the magazine 40 has been rotated to place a new slide for viewing adjacent to the projection aperture 28a. The drive motor 57 will then be energized in timed relation to cessation of movement of the magazine. It will be understood that the electrical wiring for motor 57 will permit of the energization thereof and clockwise movement of member 55 from the first terminal position notwithstanding the actuation of switch 72 by the lever 33.

As illustrated in FIG. 4, upon energization of the drive motor, the actuating member 55 will begin to rotate in a clockwise direction thereby permitting the arm 33 to rise under the urging of bias spring 62. It will be noted that during this initial movement, the drive pin 58 remains at the lowermost portion of the slot 59. Simultaneously, the upper portion of the arm 33 defining the slot 34 will slide relative to the finger 32 thereby raising the cam 36 which had previously depressed the end 32b of the finger, and the finger 32 will be urged by its spring 38 into the generally horizontal position of FIG. 4. The hooked end 32a of the finger 32 will thereby be lowered into engagement with the hook 47 of the slide holder 46.

Figure 5:
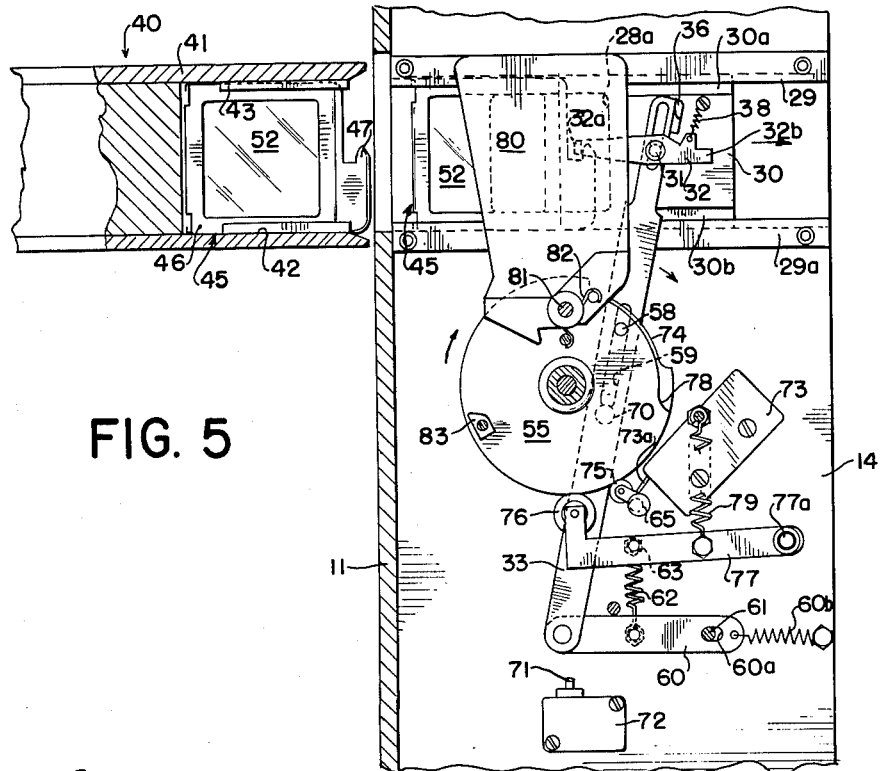

The circular actuating member 55 will continue to be rotated clockwise into the position shown in FIG. 5. It will be seen that during this movement, the driving pin 58 will slide upwardly in the slot 59 of the actuating arm 33 and will cause the arm 33 to pivot about its lower connection with the link 60. The net effect of such movement is to translate the upper end of the arm 33 laterally toward the right with respect to the projector frame.

Since the upper end of the arm 33 is attached to the slide member 30, and the latter to the finger 32, the slide member will also move toward the right along tracks 29, 29a. The slide holder 46 will be withdrawn from the magazine to the position shown in FIG. 6 and along the tracks 29, 29a until the slide is centered in the projection aperture.

Figure 6:
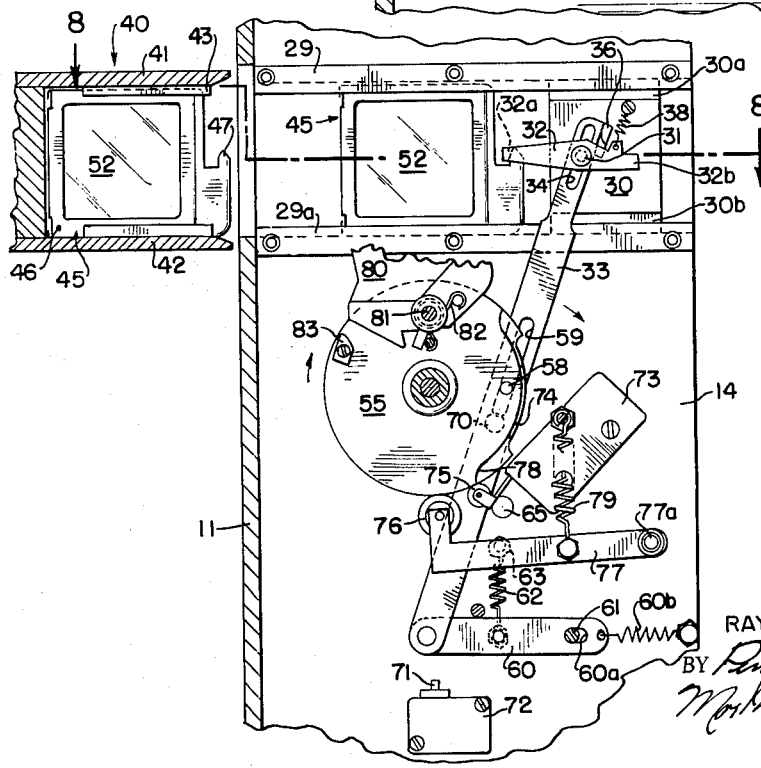

As shown with specific reference to FIGS. 6 and 7, when the drive pin 58 has reached the position of FIG. 6, it will have reached a point of maximum throw toward the right and therefore a point of maximum actuation of the upper end of the arm 33 in that direction. Thereafter, as the pin 58 moves downwardy within the slot 59, due to the continuing rotation of the member 55, a tendency would occur if not otherwise checked for the pin 58 to begin to move the upper end of the arm 33 and the finger 32, toward the left as viewed in the drawing. During such reverse movement, the hook 32a could contact the slideholder 46 to disturb the alignment of the slide with respect to the projection aperture. In order to avoid this possibility, a stop 65 is provided which rests against the arm 33 when the latter has reached the position of FIG. 6. Additionally, the side member 30 is prevented from further movement toward the right by an abutment 35 affixed to partition 14. During continued clockwise movement of the pin 58, the reaction of the lever 33 against stop 65 will cause the link 60 to translate toward the left, which is permitted by sliding of the pin 61 in the slot 60a. It will be noted that the end of the link 60 adjacent to the pin 61 is connected to one end of a coil spring 60b, whose other end is attached to the mounting partition 14. The purpose of the spring 60b is to urge the link 60 toward the right in the slot 60a until such time as movement of the link 60 toward the left is effected, as just described, by the movement of the pin 58 to the position shown in FIG. 7.

The pin 58 will continue to be driven downwardly until it bears against the buffer pad 70, further rotation of the member 55 and the drive pin 58 causing the arm 33 to translate downwardly, or generally away from the projection aperture. This latter movement will bring the cam 36 against the rear of the finger 32 to raise the hook 32a out of engagement with the slideholder 45.

Referring again to FIG. 6, it will be seen that a second switch 73 is attached adjacent to the member 55. The switch 73 is equipped with a resilient actuating arm 73a mounting a roller 75 which rides along the periphery of the member 55. The member 55 defines a first cam surface or depression 74 which receives the roller 75 when the rotation of the member 55 has proceeded to the position of FIG. 7 which may be termed the second terminal position of the member. When the roller is seated within the depression formed by the surface 74, the switch 73 will be actuated to deenergize the drive motor 57 thereby stopping clockwise rotation of the actuating member 55. Actuation of switch 72 does not occur in this thermal position of member 55.

A second roller 76 is mounted by an arm 77, which is pivotally attached to the partition 14 at 77a. The roller 76 is associated with a second cam surface or depression 78 in member 55 and the arm 77 is resiliently urged toward the member 55 and the cam surface 78 by a tension spring 79 affixed to the partition 14. As seen in FIG. 7, when the switch roller 75 has seated itself against the surface 74 to deenergize the drive motor 57, the roller 76 will simultaneously be seated against the initial curvature or stepped region of the second cam surface 78. The purpose of the latter arrangement is to assure holding of the member 55 and drive pin 58 in the terminal position of FIG. 7.

With reference again to the sequence shown in FIGS. 6 and 7, it will be observed that a shutter 80 is rotatably mounted on a shaft 81, the latter being affixed to the mounting plate 15. The shutter 80 is spring biased with respect to the plate 15 by means of a coiled leaf spring 82 such that the shutter is normally urged into vertical position to obstruct light from the source 16 through the projection aperture 28. The actuating member 55 carries a cam 83 which is attached to the forward face thereof. The cam 83 is positioned such that it will abut a lower edge of the shutter 80 at a point to the left of the pivot axis of the shutter thereby causing rotation of the shutter from the aperture 28 upon continued movement of the actuating member 55 toward its second terminal position.

It will be understood that the description of the parts and their various movements according to the sequence shown in FIGS. 3–8, will be the reverse when the drive motor 57 is energized to rotate the member 55 in a counterclockwise direction from its second terminal position. It will therefore suffice to state that the initial counterclockwise movement of the member 55 will permit the spring 62 to translate the actuating lever 33 upwardly which will lower the finger 32 into engagement with the slide holder 45. The shutter will be released by the cam 83 for return to its normal vertical position across the projection aperture. Continued rotation of the member 55 will urge the finger 32 and slide member 30 toward the left, thereby pushing the slide holder 45 along and between the tracks 29, 29a until the slide and holder have been returned to the magazine 50. Thereafter, further rotation of the member 55 to the first terminal position of FIG. 3 will cause disengagement of the finger 32 from the slide holder as described previously.

We refer now to FIGS. 9 and 10 wherein a modified form of the invention is disclosed. Members which are similar in structure and function are identified by priming the reference numerals used in the preceding description. It will be observed that the major difference between the embodiment of FIG. 9 and the embodiment of FIGS. 1–8 resides in a reversal of the positions of the parts of the loading and ejecting apparatus such that in the embodiment of FIG. 9 these parts are located above the projection aperture. The modified form of loading and ejecting mechanism includes a rotatable disc-like actuating member 55' which may be driven alternatively in clockwise and counterclockwise directions by a drive motor (not shown). The member 55' carries a drive pin 58' which is slidably received within a slot 59' in an actuating arm 33'. The latter is permitted freedom to pivot about and to translate relative to a pin 85 which is located within an end slot 86 in the arm 33'. When the actuating member 55 is in the position shown in the figure, the arm 33' has been in a translated direction generally away from the projection aperture 28' and is held in this position by means of the pin 58' which has reached the extent of its travel in that direction within the slot 59. The lower end of the actuating arm 33' immediately adjacent to the projection aperture defines a third lengthwise slot 34' which slidably engages a pivot pin 31' mounting a rotatable finger 32'. The pin 31' serves also to connect the finger 32' and a slide member 30', which is slidably supported within opposing upper and lower track members 29' and 29a'. The finger 32' is normally biased in a horizontal position by a spring 38', whose function is also to urge arm 33' downwardly, when permitted by clockwise movement of the drive pin 58'. Upward translating movement of the arm 33' moves a cam 36' attached thereto against one side of the finger to lift the hooked end 32a' thereof away from the slide.

The apparatus of FIGS. 9 and 10 includes two shutters 87, 88 each attached to a pinion 89, 90 respectively, by pins 91, 92. The pins 91, 92 are each journalled for rotation in a transverse partition or plate (not shown) forming part of the projector frame. The shutter 88 carries a pin 88a affixed to a portion thereof adjacent to the pinion 92. As best seen in FIG. 10, the actuating member 55' mounts a shutter actuating arm 93 which is pivotally connected to a member 55' by a pin 93a. Intermediate the arm 93 and the member 55' is a stationary member 94 and affixed thereto is a stop 94a which functions to limit pivotal movement of the arm 93 in a clockwise direction. The arm 93 is attached by a connection 95a to a U-shaped spring 95. The free end of the spring 95 bears resiliently against a side of the member 94 and thus urges the arm 93 in a counterclockwise direction into the position shown in FIG. 10.

The shutter arrangement of FIGS. 9 and 10 operates as follows:

When the arm 55' has been rotated counterclockwise, the end of the shutter actuating arm 93 will contact the pin 80a affixed to shutter 88. Further counterclockwise movement of member 55' will cause the shutter 88 to rotate in a counterclockwise direction into the position shown in FIG. 9. Simultaneously, the driving connection between pinions 90 and 89 will cause counter-rotation of the shutter 87 away from the projection axis. During the final actuation of the shutters by the arm 93, the spring 95 will be compressed and the arm 93 will abut the stop 94a. The resilience of spring 95 therefore, will prevent abrupt terminal movement of the arm 93.

The embodiment further includes a switch 95 having a resilient leaf spring actuator arm 96 mounting a roller 96a. The switch will de-energize the drive motor when the roller 96a arrives at and enters a depression 97 formed in the periphery of the actuating member 55'.

From what has been previously described, the operation of the loading and ejecting apparatus shown in FIG. 9 should be obvious. The actuating member 55' will be energized from its terminal position of FIG. 9 in a clockwise direction to return the slide 52' and its holder 45' to the magazine 50', thereby ejecting the slide from the projection 28'. Initial movement of member 55 permits the arm 33' to translate downwardly thus lowering the finger 32 into engagement with the corresponding hook 47' formed into the slide holder. Continued rotation of the member 55' clockwise will cause translation of the finger 32' toward the magazine 50' and insertion of the slide 52' and its holder 45' into the magazine. As a final portion of this sequence, the drive pin 58' will again translate the actuating arm 33' upwardly, or in a direction away from the projection aperture, to cause lifting of the finger out of engagement with the slide holder 45'. During this final movement a second switch 98 having a resilient actuator arm 99 mounting a roller 99a will be actuated to de-energize the drive motor. Actuation of the switch 98 occurs when the actuating roller 99a rides within a second peripheral depression 100 in the actuating member 55'.

It will be understood that the foregoing description is merely representative and that changes may be made therefrom without departing from the clear teachings of the invention. In order therefore to fully appreciate the spirit and scope of the present invention, reference should be made to the appended claims in which

I claim:

1. A loading and ejecting apparatus for a slide projector comprising a rotatable actuating member, means for driving said member about an axis, a slide actuating arm, means pivotally mounting said actuating arm at one end thereof at a point spaced from said axis, a drive pin attached to said member radially disposed from said axis, said arm defining an elongated longitudinal slot for the reception of said pin, a slide engaging finger, a projector frame defining an optical aperture adapted to receive a slide and a holder therefor, a slide member, means in said frame supporting translating movement of said member from one side to the other of the aperture, a pivot pin connecting the finger to said slide member, the end of the actuating arm opposite the pivotal mounting thereof defining an elongated lengthwise slot for the reception of said pivot pin, spring means normally biasing the finger into a generally horizontal direction, an end portion of said finger forming means to engage said slide holder, another portion of the finger forming a cam bearing surface, cam means on the ends of said actuating arm adjacent to the finger for engagement with said cam bearing surface upon a first longitudinal movement of said lever to cause said finger to pivot out of engagement with said holder, the actuating member being rotated in clockwise and counterclockwise directions respective to first and second terminal positions thereof, said drive pin effecting said first longitudinal movement when said actuating member approaches either of said terminal positions whereby said finger is disengaged from said holder, movement of the actuating member from either of the terminal positions causing reverse longitudinal movement of the actuating arm and re-engagement of the finger and holder, further movement of the actuating member between terminal positions causing the finger and slide holder to translate laterally with respect to the projection aperture.

2. A loading and ejecting apparatus for a slide projector according to claim 1 in which two adjacently overlapping shutters are mounted within said projector frame to cover the projection aperture, each of said shutters being affixed to a pinion rotatably attached to said frame, said pinions being in meshing engagement such that rotation of one shutter will cause counter-rotation of the other, and means attached to said actuating member for rotating one of said shutters away from the projection aperture upon movement of said actuating member to the second of said terminal positions.

3. A slide loading and ejecting apparatus according to claim 2 in which said actuating member and the pivotal connections of said shutters are located above the projection aperture.

4. A loading and ejecting apparatus for a slide projector comprising a projector frame, a projection aperture defined by said frame along a projection axis, track means mounted to said frame extending from side to side above and below said aperture, a generally cylindrical rotatable magazine horizontally positioned with circumferential edge portions thereof immediately adjacent to said frame, said magazine having a plurality of radial, spaced apertures each of a height generally equal to the spacing of said track means above and below the projection aperture, a plurality of slide holders in said radial apertures, each of said radial apertures being open about the periphery of the magazine for the withdrawal of individual slide holders therefrom, each of said slide holders being formed to have upper and lower edges adapted for slidable engagement within said track means, said magazine being positioned adjacent to said frame such that upper end lower side edges of the slide holders are at approximately the same level as facing surfaces of the upper and lower tracks within the projector frame, an actuating member mounted for rotation within said projector frame, means for rotating said actuating member alternately in clockwise and counterclockwise directions about an axis generally parallel to the projection axis, said actuating member and the axis of rotation thereof being displaced from and out of the path of said projection axis, a slide member slideably engaged between said upper and lower tracks, a link pivotally connected at one end to said frame, a slide actuating arm pivotally and slideably connected at one end to said slide member to drive the same in said tracks, said arm being pivotally connected at the other end thereof to said link, a rotatable hooked finger pivotally connected to said slide member for engagement with a slide holder, said finger having a cam surface and said acutating arm having a cam engageable against said surface upon movement of the actuating arm generally parallel to its own length toward said other end thereof, said finger being engageable with a slide holder when the finger is in a generally horizontal position, movement of the cam on said actuating arm against the cam surface of said finger causing disengagement of said finger from the slide holder, a drive pin affixed to said actuating member eccentrically of the axis of said actuating member, said pin engaging said actuating arm at a slot intermediate at the ends of said arm, means biasing said actuating arm generally parallel to its own length toward said one end thereof, movement of the drive pin toward said other end of said actuating arm causing said pin to bottom in said slot and thereafter to urge the actuating arm generally parallel to its own length toward said other end of said actuating arm thereby disengaging said finger from the slide holder.

5. A slide loading and ejecting apparatus according to claim 4 in which the projector frame includes upper and lower track members above and below the projection aperture extending for a distance at each side thereof, a slide member supported for slidable movement by and within said track members, said finger being pivotally connected to said slide member, said slide holder being of a shape and size to fit edgewise within track members, the actuating member being rotatable between a first terminal position wherein the slide mount is adjacent to a slide holder positioned externally of said frame and the hook means of said finger is raiser and withdrawn into said frame, said actuating member being rotatable to a second terminal position in which the slide holder is centered with respect to the projection aperture and the hook means is out of engagement with said holder, movement of the actuating member from the second terminal position toward the first terminal position causing re-engagement of the finger and holder and movement of said holder from the projection aperture in a direction to expel said holder from the projector frame, final movement of the actuating member to the first terminal position causing the finger to disengage from the slide holder.

References Cited by the Examiner
UNITED STATES PATENTS

| | | | |
|---|---|---|---|
| 2,076,924 | 4/37 | Spindler | 88—27 |
| 2,146,452 | 2/39 | Spindler | 88—27 |
| 2,375,706 | 5/45 | Stechbart et al. | 88—28 |
| 2,938,287 | 5/60 | Bernabei | 88—27 |

NORTON ANSHER, *Primary Examiner.*

EMIL G. ANDERSON, *Examiner.*